(12) United States Patent
Vrielink et al.

(10) Patent No.: US 8,561,210 B2
(45) Date of Patent: Oct. 15, 2013

(54) ACCESS TO DOMAIN

(75) Inventors: Koen Hendrik Johan Vrielink, Eindhoven (NL); Petrus Johannes Lenoir, Eindhoven (NL); Robert Paul Koster, Eindhoven (NL); Joost Reuzel, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1129 days.

(21) Appl. No.: 11/718,014

(22) PCT Filed: Oct. 28, 2005

(86) PCT No.: PCT/IB2005/053531
§ 371 (c)(1),
(2), (4) Date: Apr. 26, 2007

(87) PCT Pub. No.: WO2006/048804
PCT Pub. Date: May 11, 2006

(65) Prior Publication Data
US 2009/0144815 A1    Jun. 4, 2009

(30) Foreign Application Priority Data
Nov. 1, 2004  (EP) ................................ 04105441

(51) Int. Cl.
*H04L 29/06*   (2006.01)
(52) U.S. Cl.
USPC ................ 726/29; 726/7; 726/26; 726/27
(58) Field of Classification Search
USPC ................................................. 726/7, 10
See application file for complete search history.

(56) References Cited

U.S. PATENT DOCUMENTS

| 2004/0103312 A1* | 5/2004 | Messerges et al. .......... 713/201 |
| 2006/0015502 A1* | 1/2006 | Szucs ............................... 707/9 |
| 2007/0234432 A1* | 10/2007 | Korkishko et al. .............. 726/27 |

FOREIGN PATENT DOCUMENTS

| JP | 2003179609 A | 6/2003 |
| WO | 03047204 | 6/2003 |
| WO | 03088556 | 10/2003 |
| WO | 03092264 | 11/2003 |
| WO | 03098931 | 11/2003 |
| WO | 2004014037 | 2/2004 |
| WO | 2004027588 | 4/2004 |
| WO | 2004038568 | 5/2004 |
| WO | 2005088896 | 9/2005 |
| WO | 2005093544 | 10/2005 |
| WO | 2006035357 | 4/2006 |

OTHER PUBLICATIONS

DRM Specification V2.0, Draft Version 2.0—Apr. 20, 2004, Open Mobile Alliance, OMA-DRM-DRM-V2_0-20040420-D.*
S.A.F.A. Van Den Heuvel et al; "Secure Content Management in Authorised Domains", Philips Research, The Netherlands, IBC 2002 Conf. Publication, pp. 467-474, Sep. 12-16, 2002, XP002273504.

* cited by examiner

*Primary Examiner* — Jeffrey Pwu
*Assistant Examiner* — Thomas C Lauzon

(57) ABSTRACT

The invention relates to a method of allowing access to an authorized domain (100), the authorized domain (100) being managed by a domain manager (210), comprising a step in which a user authentication device (220), which user authentication device is linked to a foreign device (201), asserts to the domain manager that a local link (205) between the user authentication device and the foreign device is limited in distance, and a step in which the domain manager allows the foreign device to operate as a member of the authorized domain if the assertion is accepted as accurate.

10 Claims, 3 Drawing Sheets

ACCESS TO DOMAIN

Figure 1:
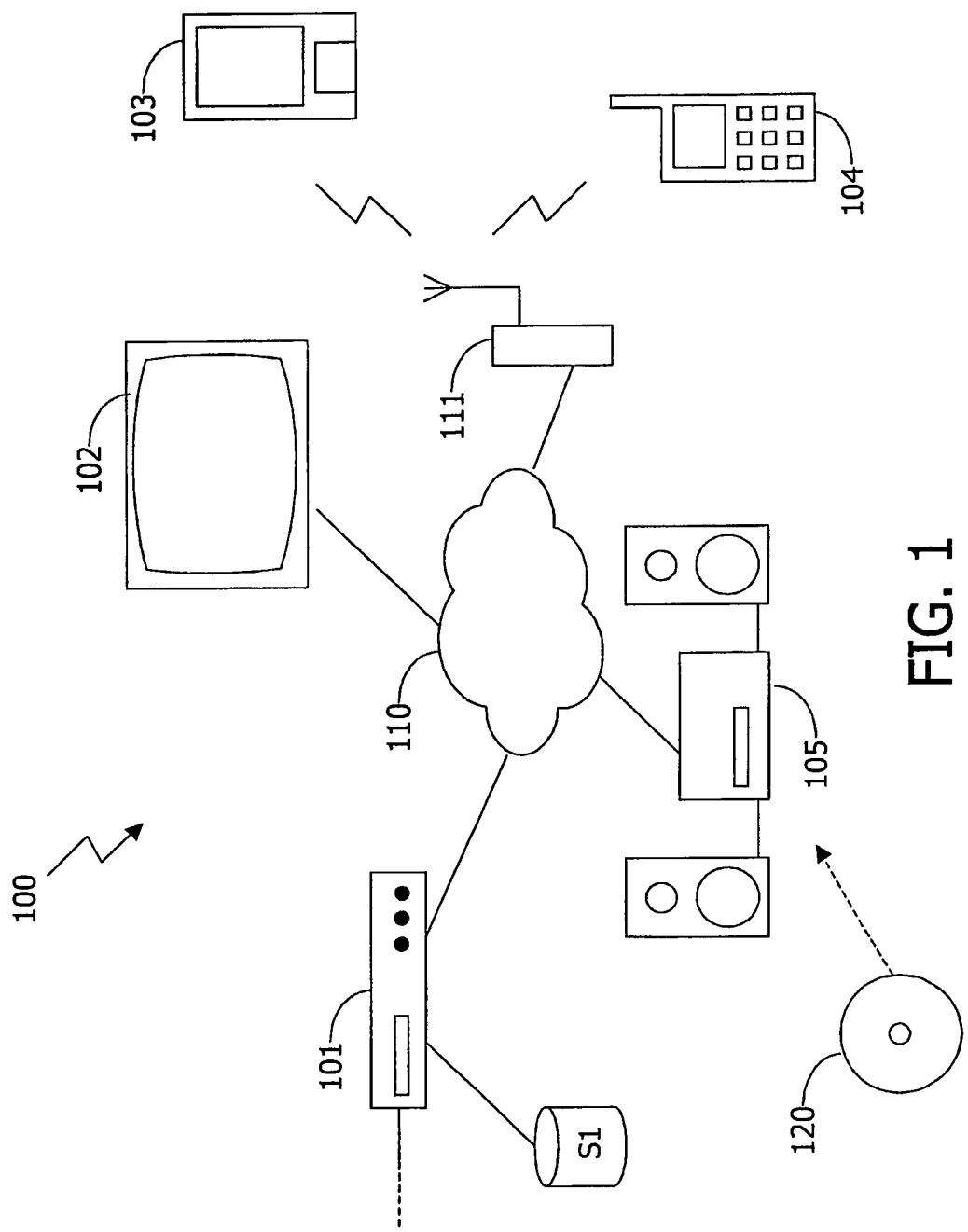

In recent years, the number of content protection systems available has been growing rapidly. Some of these systems only protect the content against unauthorized copying, while others restrict the user's ability to access the content. These systems are often referred to as Digital Rights Management (DRM) systems.

Consumers want to enjoy content without hassle and with as few limitations as possible. They want to network their devices to enable all types of different applications and easily access any type of content. They also want to be able to share/transfer content in their home environment without limitations.

The concept of Authorized Domains (ADs) tries to find a solution to both serve the interests of the content owners (that want protection of their copyrights) and the content consumers (that want unrestricted use of the content). The basic principle is to have a controlled network environment in which content can be used relatively freely as long as it does not cross the border of the authorized domain. Typically, authorized domains are centered around the home environment, also referred to as home networks.

Of course, other contexts are also possible. A user could for example take a portable device for audio and/or video with a limited amount of content with him on a trip, and use it in his hotel room to access or download additional content stored on his personal audio and/or video system at home. Even though the portable device is outside the home network, it is a part of the user's authorized domain. In this way, an Authorized Domain (AD) is a system that allows access to content by devices in the domain, but not by any others.

Authorized domains need to address issues such as authorized domain identification, device check-in, device check-out, rights check-in, rights check-out, content check-in, content check-out, as well as domain management. For a more extensive introduction to the use of an Authorized Domain, etc., see S. A. F. A. van den Heuvel, W. Jonker, F. L. A. J. Kamperman, P. J. Lenoir, Secure Content Management in Authorised Domains, Philips Research, The Netherlands, IBC 2002 conference publication, pages 467-474, held at 12-16 Sep. 2002.

Various proposals exist that implement the concept of authorized domains to some extent. In so-called device based ADs, the domain is formed by a specific set of hardware devices or software applications (referred to collectively as clients hereafter) and content. A domain manager, which can be one or more of the clients, a smart card or another device, controls which clients may join the domain. Only the specific set of clients in the domain (the members) is allowed to make use of the content of that domain, e.g. to open, copy, play or export it. Examples of such device-based ADs are given in international patent application WO 03/098931, international patent application serial number PCT/IB2005/050834 and international patent application WO 04/027588 by the same applicant, all of which are hereby incorporated by reference.

One type of device-based AD allows a set of clients bound to a domain to access content bound to that domain. This double binding assures that all the members can access the content. This structure is often established by implementing the bindings through a shared secret key. This key is chosen by a domain manager and distributed to all the members. When content is bound to the domain, the license is cryptographically linked to the domain by means of encryption with the shared key. Alternatively the content may be directly bound to one client, and the clients remain bound to the AD.

Another type of AD is the so-called person-based AD, where the domain is based on persons instead of devices. An example of such a system is described in international patent application WO 04/038568 by the same applicant, incorporated herein by reference, in which content is coupled to persons, which then are grouped into a domain.

A so-called Hybrid Authorized Domain-based DRM system ties content to a group that may contain devices and persons. This group is typically limited to a household, such that:
1. content can be watched on any of the members that belong to the household (e.g. TV in Living, TV in Bedroom, PC)
2. content can be watched by any of the users that belong to the household after they have authenticated themselves on any client (such as a television in a hotel room). Such authentication normally involves a user authentication device such as a smart card.

Examples of hybrid AD systems can be found in international patent application WO 2005/010879 and in international patent application serial number IB2005/050910, both incorporated herein by reference.

An object of the invention is to provide a mechanism to allow person based access to content in a domain in systems that are device based by design. Preferably this should be allowed without the device used by this person having to join the AD.

This object is achieved in a method comprising a step in which a user authentication device, which user authentication device is linked to a foreign device, asserts to the domain manager that a local link between the user authentication device and the foreign device is limited in distance, and a step in which the domain manager allows the foreign device to operate as a member of the authorized domain if the assertion is accepted as accurate.

To increase security in AD systems it is often required that licenses (that contain the content keys) may only be distributed to devices that are members of the domain. However, this poses a problem for hybrid ADs since in those systems it is possible to access content on devices that are not members of a domain, but instead rely on user authentication. In this scheme devices would never be able to because they could not receive the licenses.

The invention make it possible that licenses are only distributed to devices that are entitled to receive them, including devices that have the user in close proximity and where the user is authenticated, which gives the same level of security. The foreign device should only receive licenses from the authorized domain manager after the user authentication device has proven to the authorized domain manager that the user (with the user authentication device) is in close proximity.

An embodiment makes use of the fact that the domain manager can communicate with the user authentication device through the device that must be added to the domain. This resembles the situation that is common for mobile phone networks: the operator will communicate with its (trusted) SIM via a mobile phone handset. Only after authentication of the SIM, will the SIM enable the handset to engage in communication via the operator. A major difference with the present invention is that in mobile telephony it is never cryptographically established that the handset that is used for the communication is in fact the exact handset in which the SIM is installed. There is also no real need to establish this in mobile telephony systems, since a user will protect his SIM because he is charged for its usage.

However, in the AD case it is important to make sure that the device reading the smart card is the exact same device that is temporarily added to the domain. Otherwise the authentication could easily be extended to any device that required it, without additional cost for the user.

Other advantageous embodiments are set out in the dependent Claims.

Figure 2:
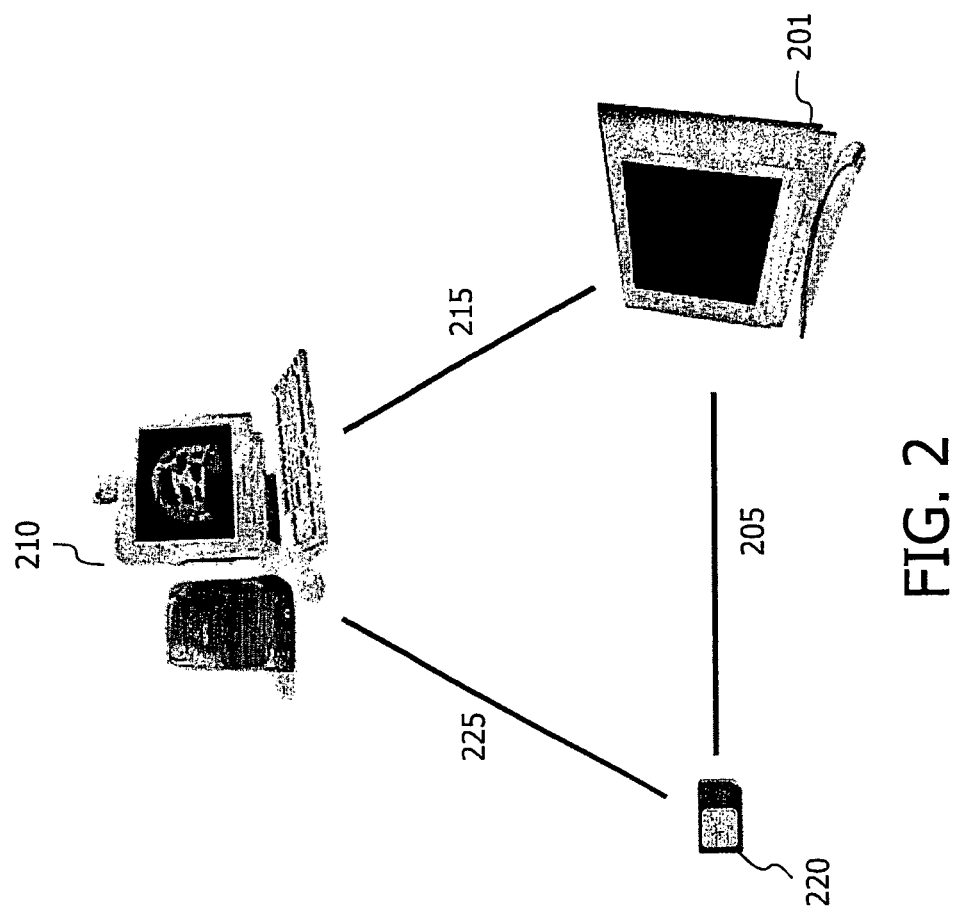

These and other aspects of the invention will be apparent from and elucidated with reference to the illustrative embodiments shown in the drawings, in which:

FIG. 1 schematically shows a system comprising devices interconnected via a network;

FIG. 2 schematically illustrates a process of a foreign device interacting with an authorized domain manager with the help of a user authentication device; and

FIG. 3

Throughout the figures, same reference numerals indicate similar or corresponding features. Some of the features indicated in the drawings are typically implemented in software, and as such represent software entities, such as software modules or objects.

FIG. 1 schematically shows a system 100 comprising devices 101-105 interconnected via a network 110. A typical digital home network includes a number of devices, e.g. a radio receiver, a tuner/decoder, a CD player, a pair of speakers, a television, a VCR, a digital recorder, a mobile phone, a tape deck, a personal computer, a personal digital assistant, a portable display unit, a car entertainment system, and so on. These devices are usually interconnected to allow one device, e.g. the television, to control another, e.g. the VCR. One device, such as e.g. the tuner/decoder or a set top box (STB), is usually the central device, providing central control over the others.

Content, which typically comprises things like music, songs, movies, animations, speeches, videoclips for music, TV programs, pictures, games, ringtones, spoken books and the like, but which also may include interactive services, is received through a residential gateway or set top box 101. Content could also enter the home via other sources, such as storage media like discs or using portable devices. The source could be a connection to a broadband cable network, an Internet connection, a satellite downlink and so on. The content can then be transferred over the network 110 to a sink for rendering. A sink can be, for instance, the television display 102, the portable display device 103, the mobile phone 104 and/or the audio playback device 105.

The exact way in which a content item is rendered depends on the type of device and the type of content. For instance, in a radio receiver, rendering comprises generating audio signals and feeding them to loudspeakers. For a television receiver, rendering generally comprises generating audio and video signals and feeding those to a display screen and loudspeakers. For other types of content a similar appropriate action must be taken. Rendering may also include operations such as decrypting or descrambling a received signal, synchronizing audio and video signals and so on.

The set top box 101, or any other device in the system 100, may comprise a storage medium S1 such as a suitably large hard disk, allowing the recording and later playback of received content. The storage medium S1 could be a Personal Digital Recorder (PDR) of some kind, for example a DVD+RW recorder, to which the set top box 101 is connected. Content can also enter the system 100 stored on a carrier 120 such as a Compact Disc (CD) or Digital Versatile Disc (DVD).

The portable display device 103 and the mobile phone 104 are connected wirelessly to the network 110 using a base station 111, for example using Bluetooth or IEEE 802.11b. The other devices are connected using a conventional wired connection. To allow the devices 101-105 to interact, several interoperability standards are available, which allow different devices to exchange messages and information and to control each other. One well-known standard is the Universal Plug and Play standard (http://www.upnp.org).

It is often important to ensure that the devices 101-105 in the home network do not make unauthorized copies of the content. To do this, a security framework, typically referred to as a Digital Rights Management (DRM) system is necessary.

One way of protecting content in the form of digital data is to ensure that content will only be transferred between devices 101-105 if
- the receiving device has been authenticated as being a compliant device, and
- the user of the content has the right to transfer (move and/or copy) that content to another device.

If transfer of content is allowed, this will typically be performed in an encrypted way to make sure that the content cannot be captured illegally in a useful format from the transport channel, such as a bus between a CD-ROM drive and a personal computer (host).

In a framework proposed in international patent application 2003/047204, the home network is divided conceptually in a conditional access (CA) domain and a copy protection (CP) domain.

Technology to perform device authentication and encrypted content transfer is available and is called a secure authenticated channel (SAC). In many cases, a SAC is set up using an Authentication and Key Exchange (AKE) protocol that is based on public key cryptography. Standards such as International Standard ISO/IEC 11770-3 and ISO/IEC 9796-2, and public key algorithms such as RSA and hash algorithms like SHA-1 are often used.

To set up a SAC, each device typically contains a unique encryption key that is used in a challenge/response protocol with another device to calculate a temporary, mutually shared key. The two devices subsequently use this shared key to protect the exchanged content and usage rights information.

As noted above, a Hybrid Authorized Domain-based DRM system ties content to a group that may contain devices or persons. Preferably, a hybrid DRM system should allow a user to authenticate on any device (e.g. with a smartcard), without requiring this device to be included in the domain. Some DRM systems however (e.g. OMA DRM) are constructed in such a way that it is impossible for a device to access domain content unless it (at least temporarily) joins the domain. Since domains must be limited, this now means that the domain manager must be involved. Furthermore, the domain size limitation(s) may prevent the device from joining the domain even though the user is authorized to access the domain content.

An object of the invention is to provide a mechanism to allow person based access to content in a domain in systems that are device based by design. Preferably this should be allowed without the device used by this person having to join the AD.

FIG. 2 schematically illustrates a process of a foreign device 201 interacting with an authorized domain manager 210 with the help of a user authentication device 220 such as a smart card. The process temporarily allows the foreign device 201 to operate as a member of the domain.

In a preferred embodiment, the process operates as follows:
1. The user authentication device 220 creates a local link 205 with the foreign device 201.
2. The foreign device 201 creates an AD link 215 to the authorized domain manager 210.

3. The foreign device 201 issues a request to join the authorized domain using the AD link 215. In this request the foreign device 201 may already specify that it has detected the user authentication device 220 (and possibly that the local link 205 is limited in distance).
4. The authorized domain manager 210 creates an authorization link 225 to the user authentication device 220 (possibly but not necessarily via the foreign device 201).
5. The authorized domain manager 210 will send a challenge to the user authentication device 220 via the authorization link 225.
6. The user authentication device 220 will respond to the challenge via the authorization link 225. In this response it will also communicate in a secure way that it is linked via the local link 205 to the foreign device 201 (and possibly that the local link 205 is limited in distance).
7. From this response the authorized domain manager 210 can conclude that indeed the foreign device 201 may temporarily be part of the authorized domain because the user authentication device 220 says that it is connected to the foreign device 201.
8. The authorized domain manager 210 sends a response to the user authentication device 220, and the foreign device 201 is authorized to perform some action related to the domain, e.g. to access content that is bound to the domain.

The user authentication device 220 can be e.g. a smart card, a mobile phone, a mobile phone containing a smart card, a biometric sensor and so on.

Note that the order of certain messages may be reversed without losing security or functionality. For example the steps of the challenge/response protocol between the user authentication device 220 and the authorized domain manager 210 and the steps involving the attestation the user authentication device 220 and the foreign device 201 that the local link 205 is distance limited may occur in a different order. Note further that the various messages could be cryptographically linked together to enforce that they all belong to the same session/transaction.

The reason for the challenge/response between the user authentication device 220 and the authorized domain manager 210 is to ensure freshness of the request and prevent replay attacks.

Having both the user authentication device 220 and the foreign device 201 declare that they make use of a distance limited channel is an option. This increases the trust at the authorized domain manager 210 and makes it easier to accept the declaration. Especially the fact that the user authentication device 220 declares that it is connected by a distance limited protocol to the foreign device 201 is important since it leverages the trust the authorized domain manager 210 already may have in the robust implementation of the secure identification device.

The proximity should be determined somehow before any declarations about proximity are made. There are many methods how this proximity can be determined in a secure way. Specific distance measuring subsystems can be used, based on various technologies. For example such a system could be GPS based.

Authenticated distance measuring protocols can be used. Examples of such protocols are described in international patent application WO 04/014037 and in international patent application serial number PCT/IB2005/053085.

The determination can be based on the fact that an interconnection technology is used for which it is known that they have a limited range, e.g. Bluetooth, DECT, NFC, media that have a maximum cable length, etc.

Several more specific embodiments will now be discussed.

The first embodiment is an add-on to version 2 of the Open Mobile Alliance's DRM *Architecture: Draft Version* 2.0, OMA-DRM-ARCH-V2_0-20040820-C, 20-8-2004, hereafter called OMAv2 for short. This document is available on the Internet at http://member.openmobilealliance.org/ftp/public_documents/bac/DLDRI/Permanent_documents/ and is incorporated by reference into the present document.

Referring to the entities in FIG. 2, the authorized domain manager 210 is now a Rights Issuer. The foreign device 201 is a rendering device, such as a television display. The user authentication device 220 is a smart card or SIM card in a mobile phone.

Figure 3:
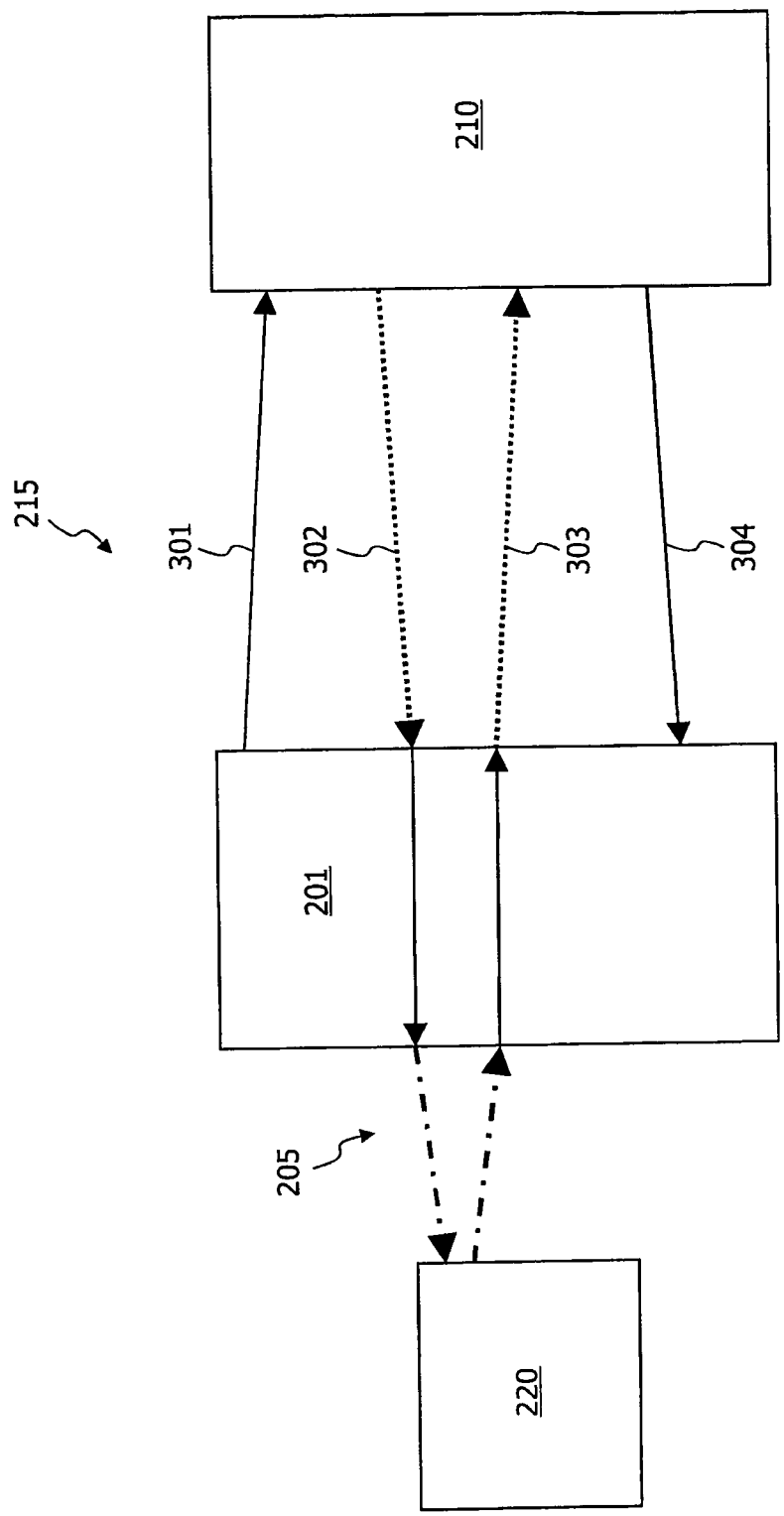

This embodiment, illustrated in FIG. 3, allows person based access to an OMAv2 domain. Person-based access in OMAv2 context is realized by a temporary connection of a device to a domain after it has proven that a smart card that is part of the domain is in the direct proximity of the device. This allows controlled temporary extensions of the domain.

Within OMAv2 a device must ask a Rights Issuer (RI) if it is allowed to join a domain. This is shown in FIG. 3 as JoinDomain Request message 301. If the device is allowed to join, the RI will provide the device with a Domain Context (DC). The DC contains the domain keys that can be used to decrypt Right Objects (RO) that relate to the domain. The ROs contain the rights expressions and keys needed for rendering the actual content. The RO acquisition, device registration, and domain management is specified by means of a set of protocols called ROAP.

In the OMAv2 specification a device that has obtained a DC cannot be forced to give up this information. Revocation (by means of domain upgrading) means that the device is not allowed to accept new content (or more precise ROs) related to the domain. Similarly, when a DC expires the device is expected not to accept new ROs related to the domain. All the content (ROs) that was accessible remains accessible. A DC is only removed when a device voluntarily leaves a domain and removes the corresponding DC.

To enforce the temporary nature of the person based access the invention proposes to add a rule that forces the device to remove the DC after a certain period of time. A "valid-until" field should be added to the DC that, if set, gives the time until which the device may retain the DC. After this time the DC must be removed.

Temporary adding the device to the domain in principle follows the normal Join-Domain ROAP protocol from OMAv2. However, the foreign device wishing to temporarily be added to the domain now adds an extension to the request in which it states that it can prove the proximity of a smart card. If the RI supports this extension, an additional protocol, which we call the Smart Card Detect Protocol (SCDP), is executed before approving the join-domain request. If the RI does not support the extension the normal RI policies to joining a domain apply. When SCDP is used and the foreign device has proven the proximity of the smart card (and/or vice versa), the RI may decide to grant the foreign device access to the domain using a JoinDomain Response message 304. Typically a "valid-until" tag will be part of the issued DC.

To prove the proximity of a specific smart card, the card must have three properties. First, to prove proximity, the smart card must use communication technologies that only work when the card is close to its communication peer. A typical solution is NFC that has a maximum distance of a few centimeters. Second, to prove the identity of the smart card, the smart card must be able to execute an authentication protocol. Third, the identity of the smart card must be related the domain in question. This registration is to be done by the provider. This can be done via the normal domain registration ROAP protocols (the smart card is to be regarded as a registered unconnected device in a domain that represents a user) at any earlier time.

The Smart card Detect Protocol (SCDP) is a two-phase protocol. In the first phase, a protected link (for example via SSL) with the device that wants to prove the proximity of a smart card is set up. Phase two comprises the authentication of the smart card by the RI. In this phase, the RI 210 sends an SCDP challenge 302 to the device 201. This challenge corresponds to the challenge of step 5 mentioned above. The device 201 passes the challenge on to the smartcard 302. The response is passed back to the RI 210 in message 303.

All communication between the smart card 220 and RI flows via the protected link between the device 201 and the RI 210, and the 'near field' communication link between the smart card 220 and the device 201. The communication between device and smart card may actually involve more messages then just a plain request response pair, e.g. when the smart card first wants to run a sub-protocol to be confident that the device is actually close.

Another embodiment focuses on a protected link in a home network, such as a UPnP-based network using protected links. In this embodiment, the authorized domain manager 210 is now a server in the (home or other) network. The foreign device 201 is a rendering device, such as a television display. The user authentication device 220 is a device carrying authorizations to render certain content.

The server and the rendering device are instructed (e.g. by a UPnP control point) to set up a connection such that the rendering device can render content that is stored at the server. The content must be protected and may only be used when authorized by the content protection system. Typically one would use distance limited protected link between the server and the rendering device (e.g. DTCP-IP), but this is not always possible (e.g. because the distance is too big) while content access would be considered legitimate for example because the user (with the user authentication device) is present at the rendering device.

To overcome this problem the invention allows the content access if the presence of the protected distance limited link 205 between the rendering device and the user authentication device can be proven as discussed above.

If these conditions are met then the content may be rendered. Note that in this case proximity (of the user authentication device 220) does not authorize (temporal) registering to a domain, but authorizes content access.

In a third embodiment, the authorized domain manager 210 is a server in the (home or other) network. The foreign device 201 is not a member of the AD managed by the authorized domain manager 210 and it is in this embodiment NOT the aim to make the foreign device 201 a member. Using the present invention, the authorized domain manager 210 determines that the user authentication device 220 is close to the foreign device 201. After this the foreign device 201 may be used to initiate or perform other ADM functions: removing a device/user; buying content for the AD; exporting content from the AD. This embodiment enables an arbitrary device with a user interface (and application logic) to perform AD management operations as long as a user of the domain is in close proximity of that terminal device. The authorized domain manager 210 this way gets a 'proof' that the requests originating from the foreign device 201 are authorized.

In a fourth embodiment the authorized domain manager 210 is a server in an authorized domain with content and licenses in the network. The foreign device 201 is a rendering device that is not in this AD. The user authentication device 220 is associated to the domain of the authorized domain manager 210.

It should be noted that the above-mentioned embodiments illustrate rather than limit the invention, and that those skilled in the art will be able to design many alternative embodiments without departing from the scope of the appended Claims. For example, the foreign device 201 may be restricted to only a limited number of accesses or may be denied access after a limited time.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer, in which a computer program, residing in a non-transitory computer-readable storage medium, instructs the computer to perform the method of the invention.

In a device Claim enumerating several means, several of these means can be embodied by one and the same item of hardware. The mere fact that certain measures are recited in mutually different dependent Claims does not indicate that a combination of these measures cannot be used to advantage.

The invention claimed is:

1. A method of allowing access to an authorized domain managed by a domain manager, the method comprising acts of:
a user authentication device linked to a foreign device, asserting to the domain manager that a local link between the user authentication device and the foreign device is limited in distance; and
when the assertion is true the domain manager providing the foreign device with a domain context including domain keys for decrypting object rights related to the authorized domain to allow the foreign device to operate as a temporary member of the authorized domain, the domain context is required to be removed after a period of time;
wherein the assertion is based on a close proximity communication protocol requirement, an authentication protocol requirement, and a domain registration protocol requirement.

2. The method of claim 1, wherein the user authentication device comprises a Secure Identification Module in a mobile phone.

3. The method of claim 1, further comprising an act of establishing the local link using a Near-Field Communication connection.

4. The method of claim 1, wherein asserting comprises an act of executing an authenticated distance measuring protocol between the user authentication device and the foreign device.

5. The method of claim 1, further comprising an act of establishing an authorization link between the domain manager and the foreign device.

6. The method of claim 5, further comprising an act of the domain manager authenticating the foreign device.

7. The method of claim 1, further comprising an act of the user authentication device authenticating the foreign device.

8. The method of claim 1, further comprising an act of the foreign device operating as a member of the authorized domain for a predetermined period of time.

9. An authorized domain system, comprising:
a user authentication device linked to a foreign device for asserting to the domain manager that a local link between the user authentication device and the foreign device is limited in distance; and
a domain manager for managing the authorized domain and, when the assertion is true, configured to provide the foreign device with a domain context including domain keys for decrypting object rights related to the authorized domain to allow the foreign device to operate as a temporary member of the authorized domain, the domain context is required to be removed after a certain period of time;
wherein the assertion is based on a close proximity communication protocol requirement, an authentication protocol requirement, and a domain registration protocol requirement.

10. A non-transitory computer readable medium storing a series of programmable instructions configured for execution by at least one processor for performing a method of allowing access to an authorized domain managed by a domain manager, the method comprising acts of:
a user authentication device linked to a foreign device, asserting to the domain manager that a local link between the user authentication device and the foreign device is limited in distance, and
when the assertion is true the domain manager providing the foreign device with a domain context including domain keys for decrypting object rights related to the authorized domain to allow the foreign device to operate as a temporary member of the authorized domain, the domain context is required to be removed after a certain period of time;
wherein the assertion is based on a close proximity communication protocol requirement, an authentication protocol requirement, and a domain registration protocol requirement.

* * * * *